Patented Sept. 24, 1940

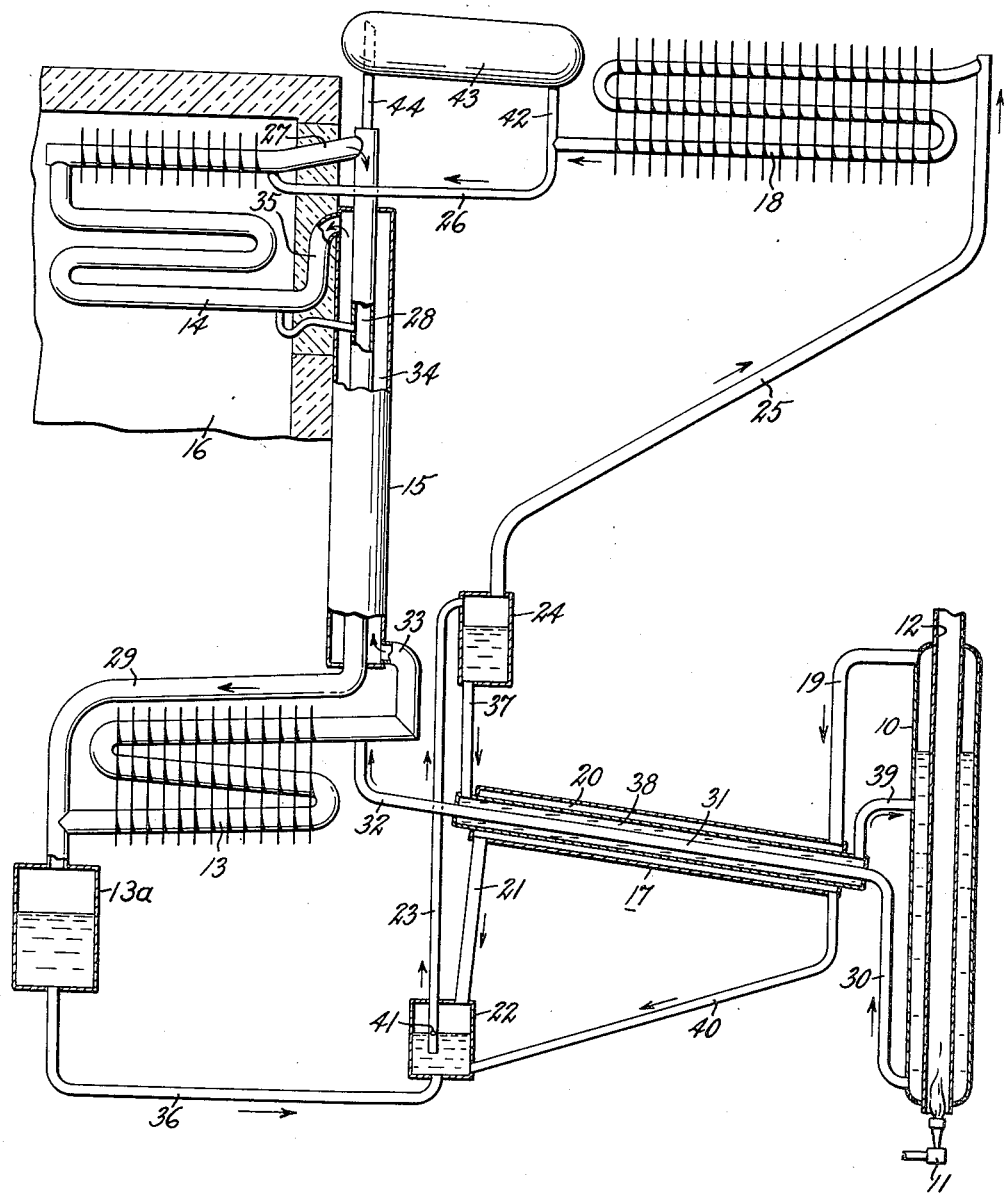

2,215,674

UNITED STATES PATENT OFFICE 2,215,674

REFRIGERATION

Hugo M. Ullstrand, Evansville, Ind., assignor to Servel, Inc., New York, N. Y., a corporation of Delaware Application January 4, 1938, Serial No. 183,257

6 Claims. (Cl. 62—119.5)

REISSUED AUG 14 1945

My invention relates to an absorption type refrigeration system and it is an object of this invention to provide a system of this type which has a higher efficiency.

The single figure of the drawing shows more or less diagrammatically an absorption refrigeration system of the type making use of an auxiliary pressure equalizing fluid and embodying the invention.

A generator 10 is heated by a gas burner 11 arranged so that the flame projects into the lower end of flue 12 which extends upward through the generator. Any other suitable heater may be used as, for instance, an electric heating element or a liquid fuel burner.

An absorber 13 and an evaporator 14 are interconnected by members including a gas heat exchanger 15. The evaporator 14 comprises a coil located in a refrigerator compartment 16. The absorber 13 comprises a coil provided with heat transfer fins for air cooling and a sump or pot 13a. The absorber may be cooled in any other suitable manner as by circulating water or a vaporization-condensation heat transfer circuit.

The absorber 13 and generator 10 are interconnected by members including a triple heat exchanger 17. The generator 10 is connected by members also including the heat exchanger 17 to an air cooled condenser 18 and the condenser 18 is connected to the evaporator 14. The connections are hereinafter described in connection with the operation of the system.

The system contains a refrigerant fluid such as ammonia, a liquid absorbent such as water, and an auxiliary pressure equalizing fluid such as hydrogen.

In operation, vapors are expelled by heating of solution in the generator 10. The vapors flow from the generator through a conduit 19, the outside passage 20 of the heat exchanger 17, a conduit 21, a vessel 22, a conduit 23, a vessel 24, and a conduit 25 to the upper end of the condenser 18. Ammonia vapor condenses to liquid in the condenser 18 and the liquid ammonia flows from the lower end of the condenser through a conduit 26 to the upper end of the evaporator 14.

Liquid ammonia flows downward in the evaporator 14 and evaporates and diffuses into the hydrogen, producing a refrigerating effect. The mixture of hydrogen gas and ammonia vapor, referred to as rich or strong gas, flows from the upper end of the evaporator through conduit 27, the inner passage 28 of the gas heat exchanger 15, and a conduit 29 to the lower part of absorber 13.

Weakened solution flows from the generator 10 through a conduit 30, the inner passage 31 of the heat exchanger 17, and a conduit 32 into the upper part of the absorber 13. Weakened solution flows downward in absorber 13 and absorbs ammonia vapor out of the gas. Weak or poor gas flows from the upper part of the absorber 13 through conduit 33, the outer passage 34 of the gas heat exchanger 15, and conduit 35 back to the lower end of evaporator 14.

Enriched absorption liquid, referred to as strong or rich solution, flows from the lower part of absorber 13 through a conduit 36, vessel 22, conduit 23, vessel 24, a conduit 37, the middle passage 38 of the heat exchanger 17, and conduit 39 into the generator 10.

Weak solution flowing through inner passage 31 of the heat exchanger 17 transfers heat to strong solution flowing in the opposite direction through the middle passage 38 of the heat exchanger, whereby the weak solution is cooled and the heat is added to the strong solution and returned thereby to the generator 10. Heat is also transferred to the strong solution from vapors flowing in the outside passage 20 of the heat exchanger 17. This cooling of the vapors is attained by condensation of water vapor to liquid and is referred to as rectification. The condensate drains from the lower end of the outside heat exchanger passage 20 through a conduit 40 into vessel 22. Any ammonia vapor that may be condensed in the outside passage 20 also drains through conduit 40 to the vessel 22. The condensate joins strong solution in vessel 22 and is returned therewith to the generator in the previously described path of flow. Heat of rectification transferred from vapor to strong solution in the heat exchanger 17 is returned with the strong solution to the generator 10 so that this heat is not dissipated but is conserved.

Vapor passing from conduit 21 through vessel 22 into conduit 23 has to pass through liquid contained in vessel 22 so that liquid is raised by vapor through conduit 23 into the circulation vessel 24.

The lower end of conduit 23 within vessel 22 may be provided with a hole 41, as shown. Vapor entering vessel 22 causes liquid therein to be depressed to the level of hole 41 whereupon the vapor enters the hole 41 and flows upward in the conduit 23. Due to a head of liquid in conduit 36 and the lower part of absorber 13, liquid also enters the hole 41 alternately with the gas so that there is formed in conduit 23 a column comprising slugs of liquid separated by rising pockets of gas. This column extending to the top of conduit 23 is balanced by the liquid column or head of liquid in conduit 36 and lower part of absorber 13. In the upper end of conduit 23, the liquid and gas emerge into vessel 24 where the liquid drops down and the vapor continues on through conduit 25 to the condenser 18. Liquid rises in vessel 24 until the level of liquid in this vessel stands above the level of liquid in the generator 10 a distance equal to the height of the surface level of liquid in the absorber 13 above the hole 41 in the lower end of conduit 23, whereupon liquid flows in the previously described path from vessel 24 into the generator 10. An analyzing effect is obtained by the bubbling of vapor through strong solution in passing through vessel 22 and the vapor lift conduit 23.

Various modifications and changes may be made within the scope of the invention which is not limited except as indicated in the following claims.

What is claimed is:

1. In an absorption refrigeration system, a generator, a rectifier, an absorber, and a vapor liquid lift for causing circulation of absorption liquid between said generator and absorber, said rectifier being arranged for cooling thereof by absorption liquid flowing toward the said generator, and said lift being connected to said absorber and said rectifier and said generator to receive liquid from both said absorber and rectifier, and vapor from said generator.

2. A system as set forth in claim 1 in which the generator vapors flow first through said rectifier and then to said lift.

3. In an absorption refrigeration system, a generator, a rectifier, an absorber, a liquid heat exchanger connected between said generator and absorber, said rectifier being in heat transfer relation with said exchanger, and a vapor liquid lift for causing circulation of absorption liquid between said generator and absorber through said exchanger, said lift being connected to receive liquid from both absorber and rectifier and vapor from said generator.

4. An absorption refrigeration system including a generator, a rectifier for vapor from said generator connected to said generator and arranged to be cooled by absorption liquid flowing to said generator, and an analyzer in which the vapors from said generator flow and contact with absorption liquid flowing to said generator and which is connected to the rectifier to receive both condensate and vapor from said rectifier.

5. An absorption refrigeration system including a generator, a rectifier for vapors from said generator connected to said generator and arranged to be cooled by absorption liquid flowing towards said generator, and a vapor liquid lift connected to said rectifier to receive both condensate and vapor from said rectifier.

6. An absorption refrigeration system including a generator, an absorber, a rectifier for vapors from said generator connected to said generator and arranged to be cooled by absorption liquid flowing from said absorber towards said generator, and a vapor liquid lift for causing said flow connected to said absorber and said rectifier to receive vapor from said rectifier and liquid from both said absorber and rectifier.

HUGO M. ULLSTRAND.